April 15, 1958 — L. B. GRIFFITH — 2,830,947
METHOD OF FORMING AND MAINTAINING AN ORGANIC FILTER
Filed Oct. 26, 1954
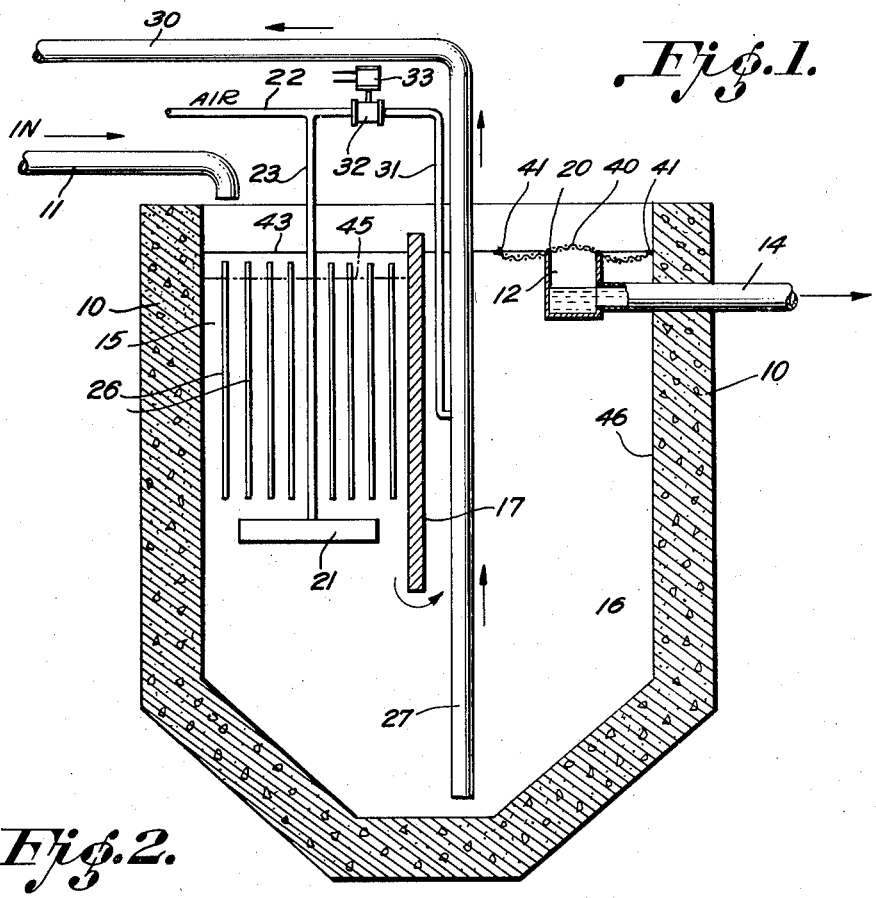
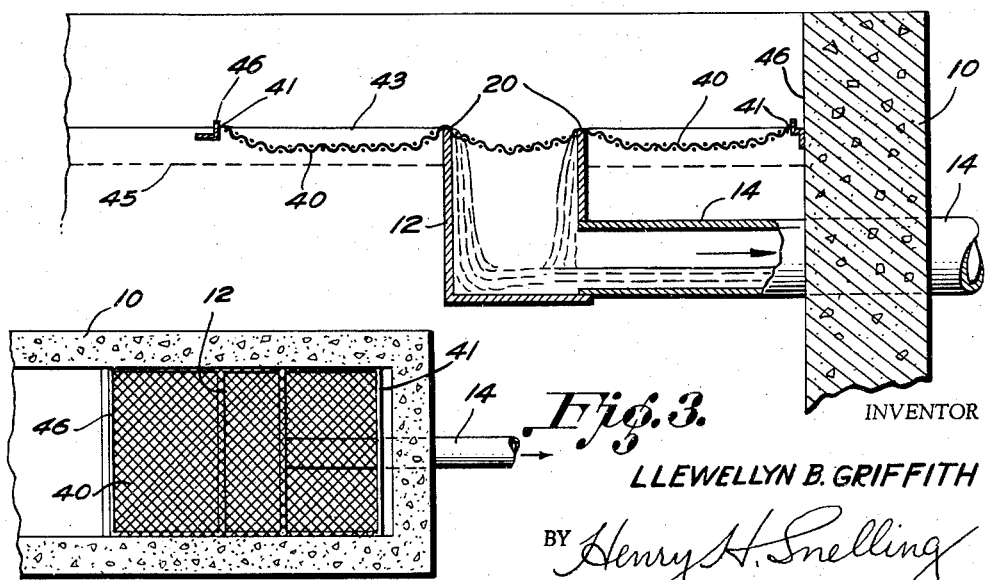
INVENTOR
LLEWELLYN B. GRIFFITH
BY Henry H. Snelling
ATTORNEY

United States Patent Office 2,830,947
Patented Apr. 15, 1958

2,830,947

METHOD OF FORMING AND MAINTAINING AN ORGANIC FILTER

Llewellyn B. Griffith, Arlington, Va.

Application October 26, 1954, Serial No. 464,672

2 Claims. (Cl. 210—17)

This invention relates to the treatment of sewage fluids that have been reduced in suspended organic matter to below 50 parts per million and has for its principal object the provision of a method and apparatus for taking from the final effluent of a sewage system the greater part of the short chains of denitrifying slimes that have sloughed off in a late stage of sewage purification and with these slime particles of from one-eighth to one-half inch long to take from the liquid most of the colloidal particles previously held in suspension and other particles which might settle in a quiet settling basin but which are too small to settle when there is a moving stream as would be the case in most of the tanks of a sewage system. It even removes colloids which are defined as particles so small that the molecular movement in the water keeps them in suspension regardless of flow or no flow—these colloids attach themselves to the slimes on the mat and form large particles made up of hundreds of little colloids. Since the combined mass is relatively large it is too large to be kept in suspension by molecular bombardment and settles.

A further object of the invention is to remove tiny particles from a sewage system by means of an organic filter formed by placing a foraminous supporting structure such as a wire screen of a quarter of an inch mesh, or perhaps larger, and seeding on this screen a soft velvety mat of micro-organisms which apparently are plentiful in the air in the neighborhood of final sewage tanks as well as in the effluent itself.

A still further object of the invention is to provide for the continuance of a mat formed as above, this being carried out by making the pool above the organic matter so shallow that the filter can either be raised above the liquid level in the tank at suitable periods so as to provide the oxygen which is necessary to the continued life of the filter mat, or be raised close to the water surface where the film of water surface is saturated with air and where certain of these slimes include chlorophyll-bearing organism capable of providing for the keeping alive of the organisms. While it would be possible to raise the organic filter above the level of the liquid, a much simpler method of accomplishing the same result is to lower the liquid level in the tank for a short interval of time to a point sufficient to allow air to be in contact with the bottom surface of the mat formed on the supporting screen.

The present invention has been found most useful in connection with sewage plants which have been hydraulically overloaded with a consequent lack of time in which the solids could properly settle, necessitating the filtering out of particles of suspended organic matter. For best results these solids should not greatly exceed 30 parts per million although the method will work, perhaps a bit less efficiently, with liquids running up to 50 parts per million of suspended organic matter. With an overloaded plant I have been able to remove 93% of the settleable solids in a final tank by using the organic filter of the present invention as against a removal of a maximum of 80% by best means known other than the filter.

In the drawings:

Figure 1 is a section through a final tank;

Figure 2 is an enlarged view of the filter with the liquid level depressed.

Figure 3 is a plan of Fig. 2.

The tank 10 is a final tank of a sewage system receiving the partly purified liquid through the pipe 11. The liquid flows out through a transverse channel 12, the sides of which form wiers and lead to an effluent pipe 14 which discharges either to a stream, a pool or in any other desired manner.

The tank is optionally divided into an aerating chamber 15 and a settling chamber 16 separated by a wall 17 which extends well above the normal liquid level in the tank as determined by the wier edge 20 of the passage 12 and extending to a point about one foot below the aeration air pipes 21 fed by main air pipe 22 through a branch pipe 23. Much of the nitrifying slimes on the plates 26 in the aeration chamber 21, when sloughed off, falls to the hopper 27 in the bottom of the tank and is drawn off at regular intervals of say 45 minutes through eduction pipe 30 fed by air pipe 31 having a valve 32 controlled by a time-operated solenoid 33. The particles which do not fall into the sump or hopper 27 are the ones with which we are particularly concerned in the present invention. These tiny particles many of which are in the colloidal state are unable to settle in chamber 16 because of their almost microscopic size and because of the steady flow upward and to the channel 12, hence if not taken from the liquid they would pass to the effluent pipe 14.

To keep these tiny particles from so passing from the system a wire mesh 40 is arranged to pass over the two wier edges 20 of the passage 12 and extend a foot or so on the side nearest the central baffle 17 with its free folded end 41 supported in any manner above the normal level 43 in the tank so that all of the liquid entering the passage 12 on that side shall necessarily pass through the screen. The length of the screen is preferably the same as the length of the passageway. On the smaller side the wire screen is secured as at 41 to the wall 46 of the tank and like its companion wall portion prevents any liquid from passing to the effluent pipe 14 except through its meshes, consequently there will be formed on both sides of the passage a small pool generally about ½" deep, although it could be a number of times that depth, about 12" wide and roughly 8 feet long, depending largely, of course, on the size of the tank.

As air is admitted to branch air pipe 31 by the opening of valve 32, the air lift 30 will lower the level of the tank as shown best in Fig. 2, the line 43 of Fig. 1 representing the normal level in the tank and the dot-and-dash line 45 representing the depressed level, whereas the line 45 is shown in full line in Fig. 2, and the normal level by a dot-and-dash line. The element 46 is an elongated angle-iron or other rail to which the end 41 of the wire 40 is secured. In Figs. 2 and 3 the effluent discharges over a wier 20 and the wire screen 40 is secured to the wall of this wier. The screen 40 is consequently exposed at its bottom to the atmosphere each time the air lift lowers the water level to a point approximating the line 45, which is roughly every hour. This forms a sort of back-wash and apparently provides sufficient oxygen to keep alive the algae or other micro-organisms that readily seed themselves, apparently from the air, on the wire screen 40 and form a velvety mat 50 on the wire. This mat grows to a thickness of as much as three quarters of an inch in five days and after that seems to remain at just the same thickness, the micro-organisms of the mat apparently having a rather high tolerance for the chlorine gas when it is advantageous to use this tank for chlorination; provided of course that they can get oxygen at regular intervals and are never allowed to dry out by being kept out of the liquid too long.

The operation is as follows: a wire mesh screen is placed over the wier of a final settling tank in such fashion as to form one or more shallow pools of ½" to not greater than 2" in depth, the pools being preferably of the length of the wier and requiring that most of the liquid leaving the tank shall pass through this screen. In just a few days the screen is coated with a soft velvety mat of micro-organisms and these micro-organisms on their supporting screen form a filter which efficiently prevents a great portion of the fine colloidal particles including sloughed off slimes from the plates suspended above the aeration section of the sewage system, from passing from the system. The exact nature of the action is not understood but where the liquid level is drawn down below the mat of algae on the screen a number of spaced intervals per day, the mat serves continuously as a filter and requires no further attention.

What I claim is:

1. The steps in the method of purifying sewage in a number of successive treatments which consists in flowing the treated liquid containing less than fifty parts per million of solids at a pressure equal to a head of a few inches of water into a final and quiescent body of liquid, passing the liquid through an organic filter immediately before discharging the liquid from the system, thus preventing a great portion of the colloidal particles from passing out with the discharge fluid, and lowering the liquid level of said quiescent body of the treated liquid beneath the filter at a number of intervals during a 24 hour day, for a period of less than that which would cause the organisms to die for lack of moisture.

2. The method of forming and maintaining an organic filter to screen out sloughed-off particles of sewage bacilli in a quiescent body of liquid forming the final stage of sewage purification, which consists in providing a foraminous support proximate the discharge of liquid from the system for seeding with air-borne micro-organisms at a level just below the level of the liquid surface of the treated liquid, and at spaced intervals during the day lowering the level of the liquid surface to about that of the seeded support to provide the oxygen necessary for continued life of the mat of micro-organisms on the filter support.

References Cited in the file of this patent

UNITED STATES PATENTS

| | | |
|---|---|---|
| 251,056 | Langford | Dec. 20, 1881 |
| 530,622 | Scott-Moncrieff | Dec. 11, 1894 |
| 609,524 | Knight | Jan. 7, 1902 |
| 853,217 | Bordigoni | May 14, 1907 |
| 2,283,166 | Buell et al. | May 19, 1942 |
| 2,616,848 | Griffith | Nov. 4, 1952 |
| 2,663,425 | Haselwood | Dec. 22, 1953 |
| 2,708,571 | Fischerstrom et al. | May 17, 1955 |

FOREIGN PATENTS

| | | |
|---|---|---|
| 50,963 | Switzerland | Mar. 22, 1910 |